Nov. 24, 1964 F. W. KELLEY, JR., ETAL 3,158,799
FIRING CIRCUIT FOR CONTROLLED RECTIFIERS
Filed Jan. 18, 1960 2 Sheets-Sheet 1
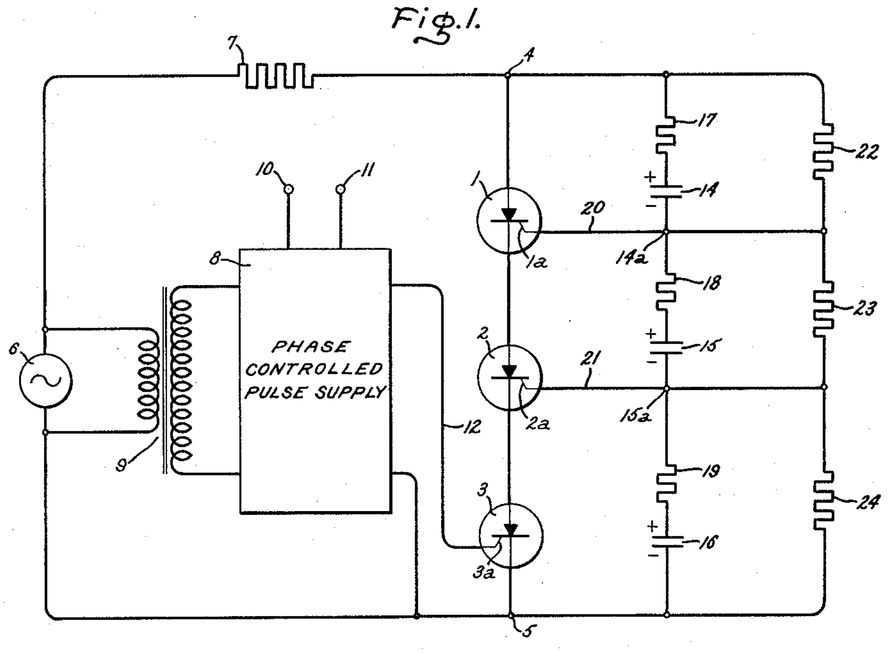
Fig.2.
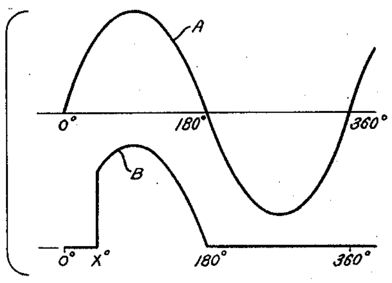
Fig.3.
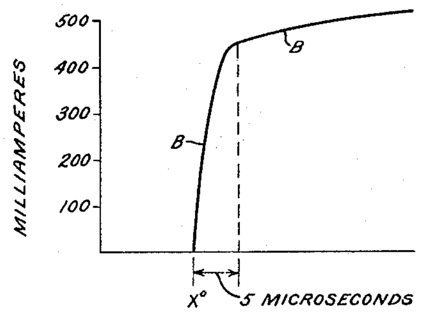
Fig.4.
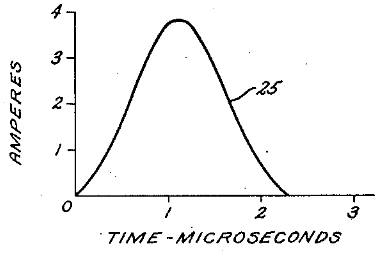
Inventors:
Fred W. Kelley, Jr.,
Georges R. Lezan,
Charles E. Rettig,
by Irving H. Marshman
Their Attorney.

Inventors:
Fred W. Kelley, Jr.,
Georges R. Lezan,
Charles E. Rettig,
by Irving H. Marshman
Their Attorney.

3,158,799

FIRING CIRCUIT FOR CONTROLLED RECTIFIERS

Fred W. Kelley, Jr., Media, Pa., Georges R. Lezan, Haddonfield, N.J., and Charles E. Rettig, Havertown, Pa., assignors to General Electric Company, a corporation of New York Filed Jan. 18, 1960, Ser. No. 3,143
11 Claims. (Cl. 321—27)

This invention relates to electric power supply equipment and more particularly to power supplies in which rectifiers are utilized for switching the output on or off or for controlling the output over a desired range.

An electrical circuit component recently made available to the electrical and electronic industries is a semiconductor device now widely referred to as a controlled rectifier. The controlled rectifier is a three junction semiconductor device whose reverse characteristic is similar to that of a normal semiconductor rectifier in that it represents essentially an open circuit with negative anode to cathode voltage. The forward characteristic is such that it will block positive anode to cathode voltages below a critical breakover voltage if no signal is applied to the gate terminal. However, if the forward breakover voltage is exceeded or if an appropriate gate signal is applied, the device will rapidly switch to a conducting state and present the characteristically low forward voltage drop of a single junction semiconductor rectifier. The controlled rectifier behavior is similar in some respects to a mercury vapor thyratron. Like the thyratron, once the controlled rectifier has been fired by its control or gate element it can only be turned off by removal or reversal of its anode voltage. Thyratrons, however, are fired by a potential on the grid of the tube, whereas the controlled rectifier is fired by current flowing through its gate element. Other characteristics which distinguish the controlled rectifier from the mercury thyratron include much faster firing and recovery times, i.e., of the order of one microsecond, very low potential drop when conducting, and in general those advantages inherent in the use of semiconductor devices over heated cathode tubes.

The controlled rectifier consists basically of a four layer pnpn device with an ohmic connection to the inner p region of the unit. The controlled rectifier blocks current in either direction until a critical forward breakover voltage is exceeded. At this voltage the center pn junction begins to avalanche. Current through the device increases rapidly until the current gain exceeds unity. This current level is relatively low. When reached and exceeded, it effectively reverses the bias of the center pn junction. Voltage across the device then becomes low and the current is limited essentially only by the external series load impedance. The application of a gating current signal to the ohmic connection switches the controlled rectifier from the non conducting state to a conducting state without the necessity of exceeding the critical breakover voltage. The device can be fired by current pulses of extremely short duration. Controlled rectifiers may be destroyed if subjected to voltages, either forward or reverse, in excess of a predetermined value. Consequently, it is customary for manufacturers of controlled rectifiers to specify voltage ratings which must not be exceeded.

Since controlled rectifiers are expensive devices, it is vitally important that they should not be subjected in their unfired condition to voltages substantially in excess of the rated value. One method of achieving this result would be to employ a controlled rectifier in combination with sources having maximum voltages that do not exceed the rated voltage of the rectifier. Frequently, however, the characteristics of the load require a voltage very substantially in excess of the highest voltage rating controlled rectifier available. In such cases it becomes necessary to connect two or more controlled rectifiers so as to divide the total source voltage and thus to limit the voltage across any one rectifier in its unfired condition to a value not substantially in excess of the rated value. This gives rise to a problem of firing the series connected rectifiers approximately simultaneously.

In order to change a controlled rectifier from its unfired state to its fired state appropriate firing circuitry is provided for supplying a control pulse to the gate electrode of the controlled rectifier. In the event that the rectifier is being supplied from an alternating voltage source the firing circuitry is designed to supply control pulses to the gate of the controlled rectifier at intervals that are related to the phase of the supply voltage. Owing to the difference in levels of the anode voltages of two or more controlled rectifiers connected in series relationship to a source, the extension of conventional firing circuitry to a series combination of controlled rectifiers would become quite complex. Such complexity together with the added power requirements would result in an expensive firing unit. Thus, substantial savings may be realized if all rectifiers in the series combination can be fired without the firing circuits having to do more than fire one of the rectifiers in the combination. Accordingly, an object of the invention is the provision of a firing unit which employs a conventional firing circuit capable of firing one of the rectifiers in a series combination and in which additional simple and inexpensive means are provided for sympathetically firing the remaining rectifiers in the series combination substantially simultaneously with the firing of the first rectifier.

Another object of the invention is the provision in such additional firing circuitry of means for approximately equally dividing the voltage across the controlled rectifiers of the series combination in their unfired state.

Still another object of the invention is the provision in such firing circuitry of means for providing dynamic balance of the distribution of voltage across the controlled rectifiers during the turn-on period and during the subsequent conducting period.

In carrying the invention into effect in one form thereof, in order that a controlled rectifier shall not be subjected to destructive voltages from a source, a plurality of controlled rectifiers are connected in series relationship with each other to terminals which are adapted to be connected to a source of supply the voltage of which exceeds the voltage rating of any one of the controlled rectifiers. Means are provided for supplying gating current signal impulses to the gate of one of the series connected controlled rectifiers to initiate conduction therein, and additional means are provided for causing the remaining unfired rectifiers to become conducting which comprises an impedance voltage divider connected in parallel with the rectifiers together with electrical connections from the gate of each of the remaining rectifiers to a corresponding intermediate point of the voltage divider.

For a better and more complete understanding of the invention reference should now be had to the following specification and to the accompanying drawings of which:

FIG. 1 is a simple diagrammatical sketch of an embodiment of the invention in which three controlled rectifiers are connected in series relationship;

FIG. 2 is a graphical representation of the voltages and current at different points in the circuit shown in FIG. 1;

FIG. 3 is an enlargement of a portion of one of the curves of FIG. 2;

FIG. 4 is a graphical representation of a gate current pulse supplied to one of the controlled rectifiers for causing it to become conducting in response to firing of another of the series connected controlled rectifiers by conventional firing circuitry.

Figure 5:
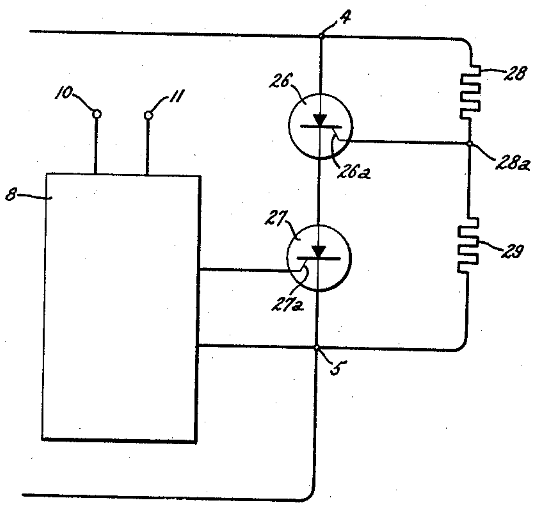
FIGS. 5 and 6 are fragmentary schematic diagrams of modifications.

Referring now to the drawing, a plurality of controlled rectifiers 1, 2 and 3 are connected in series relationship with each other to terminals 4 and 5 to which voltage is supplied from a suitable source 6 that is illustrated in FIG. 1 as a source of periodically varying voltage such as an A.-C. source. A load 7 is connected in series relationship between one terminal of the source and terminal 4. The other terminal of the source 6 is directly connected to terminal 5. Although the embodiment of FIG. 1 involves an application in which the controlled rectifiers are supplied from an A.-C. source, the invention has utility in direct current applications as well.

In the illustrated embodiment of the invention it may be assumed that the load 7 is of a character that requires a voltage that is in excess of the combined ratings of two controlled rectifiers but is less than that of three rectifiers; consequently three controlled rectifiers are used in the series connection. This number could of course be larger or smaller than three depending on the character of the load and the ratings of the rectifiers.

As previously stated, a controlled rectifier possesses the ability to block current flow in either direction until a gating signal is applied to its gate electrode. Without such a gating signal, no current can be delivered to the load circuit. Any suitable form of firing circuit may be utilized for supplying a pulse gating signal to the gate electrode of one of the controlled rectifiers; consequently a firing circuit 8 illustrated conventionally is provided for supplying pulsed gating signals to the gate electrode 3*a* of controlled rectifier 3. Although this unit may be of any suitable type it is preferably of the amplistat type and is supplied through a transformer 9 from the source 6 or from another suitable source that is synchronized therewith so that the output pulses which it supplies to the control electrode 3*a* are synchronized with the periodically varying voltage that is supplied to the anodes and cathodes of controlled rectifiers 1, 2 and 3. An amplistat includes a saturable core member, an alternating current winding mounted thereon and a diode blocking rectifier in series with the winding. A saturation control winding is also mounted on the core member and is connected to control input terminals 10 and 11 which in turn may be connected to any suitable source of adjustable direct voltage. The blocking rectifier permits only unidirectional current flow in the alternating current winding of the amplistat.

At the start of the positive half cycle of alternating current supply, current will flow in the alternating current winding of the amplistat. As the voltage builds up in the positive half cycle, current will begin to flow through the diode and through conductor 12 into the gating circuit of controlled rectifier 3. This initial current is insufficient to fire the controlled rectifier since it is limited to a very small value by the large inductance of the A.-C. winding of the amplistat which continues to be large only as long as the saturable core maintains a high permeability. When the core becomes saturated, the A.-C. winding no longer limits the current in the circuit and the current output of the amplistat will immediately rise to a comparatively large value sufficient to fire the controlled rectifier. During the remainder of the cycle, the current produced by the amplistat through the gating circuit of the controlled rectifier continues to flow. By varying the current in the control winding, the firing point of the amplistat in each cycle of the alternating voltage can be controlled since with a resistive load, the firing angle is a substantially linear function of the control signal applied.

The manner in which the output or the load circuit currents are controlled may be visualized in connection with FIG. 2 which shows the nature of some wave forms present in the power supply. Curve A illustrates the alternating voltage output of the source. The curve B illustrates the wave shape of the currents supplied by the amplistat to the gate electrode 3*a* of the controlled rectifier 3. This curve has a steep leading edge which occurs at the moment represented by $x°$ when the amplistat core saturates. By increasing or decreasing the level of the control signal current applied to the control winding of the amplistat, the phasing or firing angle at which the steep front of wave B occurs may be varied substantially throughout the entire range between 0 degrees and 180 degrees to control and determine the instant at which the controlled rectifier is caused to conduct. In this respect, the leading edge of the amplistat current signal B is of most importance since once the controlled rectifier has begun to conduct, the gate signal no longer has any effect.

For the purpose of effecting sympathetic firing of the rectifiers 1 and 2 (which do not receive firing current impulses from the phase controlled pulse supply 8) an impedance voltage divider is connected in parallel with the controlled rectifiers 1, 2 and 3 to the terminals 4 and 5. This voltage divider comprises a plurality of energy storage devices which are illustrated as capacitors 14, 15 and 16 each associated with a corresponding one of the rectifiers. Typically, each of these capacitors may have a capacitance of .4 microfarad. Between capacitor 14 and terminal 4 is connected a resistor 17 and similarly, between capacitor 15 and intermediate terminal 14*a* and between capacitor 16 and intermediate terminal 15*a* resistors 18 and 19, respectively, are connected. These resistors 17, 18 and 19 have relatively low values, e.g., in a typical case each may have a value of 3.3 ohms.

A conductor 20 serves to connect the gate electrode 1*a* of controlled rectifier 1 to intermediate terminal 14*a* and a conductor 21 connects the gate electrode 2*a* of controlled rectifier 2 to intermediate terminal 15*a*.

Controlled rectifiers such as rectifiers 1, 2 and 3 selected at random from stock are generally not sufficiently uniform in their characteristics to divide the prestarting voltage equally. In addition to supplying firing energy to rectifiers 1 and 2, the series connected capacitors serve to divide the prestarting voltage across the series connected rectifiers. Since it is desired that the separate voltages across the rectifiers shall be equal, the capacitors 14, 15 and 16 are fairly closely matched, i.e., they should be matched to within the tolerance to which it is necessary to balance the voltages across the rectifiers in order to avoid destruction. For example, if the voltage of a source is 900 volts and each rectifier has a voltage rating of 500 volts, a real close match of the capacitors is unnecessary since any one of the rectifiers could support more than half the total prestarting voltage of the source. However, if the voltage of the source is 1400 volts no one of the cells can support more than 35 percent of the total prestarting voltage without being damaged. In this case, the unbalance must not exceed 10 percent and accordingly the capacitors should be matched to within 10 percent.

Resistors 17, 18 and 19 are provided primarily for the purpose of preventing oscillations in the capacitor circuits in the case of an inductive load circuit or inductance associated with the source; consequently these resistors are referred to as damping resistors. For very fast transients, these damping resistors constitute the main part of the impedance of the capacitor-damping resistor combination, and for this reason it is desirable that these resistors should be matched to within the range of 5 to 10 percent unless other means of surge protection are provided.

Since the gate to cathode of a controlled rectifier exhibits rectifying properties, impedance terminated at the gates may accumulate charges due to gate rectification. Such accumulated charges may adversely influence the firing of the rectifiers 1 and 2 which are fired by energy supplied from the capacitor circuit. To prevent the accumulation of such adverse charges on the capacitors, resistors 22, 23 and 24 each connected in parallel with a corresponding one of the capacitor damping resistor combinations 14, 17; 15, 18; and 16, 19 respectively are provided. These resistors have fairly high ohmic values; typically each has a resistance of 10,000 ohms and preferably they are matched to within a range of 5 to 10 percent.

With the foregoing understanding of the elements and their organization, the sympathetic firing operation of the controlled rectifiers will readily be understood from the following description.

Prior to starting, the capacitors 14, 15 and 16 are charged positively and negatively in each positive and negative half cycle of the supply voltage. In the positive half cycle in which conduction of the rectifiers is to be initiated the capacitors are being charged positively at their upper terminals (as seen in FIG. 1) and negatively at their lower terminals as indicated by the polarity markings for these capacitors illustrated in FIG. 1.

In order for the controlled rectifiers 1 and 2 to fire, the anode voltage of rectifier 1 must be positive with respect to the cathode voltage of rectifier 2 and the anode voltage of rectifier 2 must be positive with respect to the cathode voltage of rectifier 3 at the time the firing pulse from the phase controlled pulse supply 8 is received at the gate *3a* of rectifier 3. As previously stated, the approximate point in the positive half cycle at which this firing pulse is supplied depends upon the level of the direct current that is supplied through terminals 10 and 11 of the phase controlled pulse supply 8. The voltage of gate *2a* must be approximately half way between the anode voltage of rectifier 2 and the cathode voltage of rectifier 3, and the voltage of gate *1a* must be approximately half way between the anode voltage of rectifier 1 and the cathode voltage of rectifier 2, thus assuring that the capacitors are in a properly charged state for supplying energy to the gates of rectifiers 1 and 2 for the purpose of sympathetic firing. As shown on an enlarged time scale in FIG. 3 in which abscissae units represents microseconds, the steep front of the firing signal pulse supplied from the phase controlled pulse supply to the gate *3a* is not perfectly vertical but rises to its maximum value in a few microseconds. As a result of this pulse signal current in the gate circuit, the controlled rectifier 3 begins to become conducting at a point on curve B at which the instantaneous magnitude of the pulse equals the current required to fire the rectifier. This value varies from one rectifier to another; the maximum value may be assumed to be of the order of 100 milliamperes.

As controlled rectifier 3 begins to become conducting, the voltage across its anode and cathode begins to collapse. At this time current to support initial conduction in controlled rectifier 3 can only be obtained from the impedance voltage divider network and as a result current begins to flow from intermediate terminal *15a* of the parallel capacitor circuit through the gate *2a* of controlled rectifier 2. This current supplied to the gate *2a* generally takes the form of the current pulse illustrated by curve 25 in FIG. 4 in which ordinates represent amperes gate current and abscissae represent time. The actual peak value of this pulse depends upon the point in the positive half cycle of the source voltage in which the pulse is initiated. The peak value of 4 amperes illustrated in FIG. 4 is representative of the case in which the pulse is initiated near the peak of the positive half cycle of the source voltage. If the pulse is initiated much earlier or much later in the positive half cycle the peak value would be much less than that illustrated in FIG. 4 but would still be adequate to fire the controlled rectifier. As shown, this pulse rises to its maximum value in approximately one microsecond. As the current (as illustrated by pulse 25) rises in the gate circuit of controlled rectifier 2, the accumulation of ampere seconds initiates the turn-on process of control rectifier 2 and as it begins to become conductive the voltage across its anode and cathode begins to collapse.

In response to the decrease in the positive value of the anode voltage of controlled rectifier 2, current begins to flow from intermediate terminal *14a* through the gate *1a* of controlled rectifier 1 and within a small fraction of a microsecond, rectifier 1 begins to become conductive.

Thus, the gate of the master controlled rectifier is pulsed with a normal pulse such as represented by curve B, FIGS. 2 and 3. As a result, the amplifying avalanche breakdown mechanism of master controlled rectifier 3 produces anode current that can only be supplied from the divider network through the gate 22 to the cathode of controlled rectifier 2. The start of the turn on process, or in other words the start of the collapse of voltage across the anode and cathode of controlled rectifier 3 causes a gate current pulse to flow in the adjacent sympathetically fired controlled rectifier 2. This gate current pulse resulting from the start of the collapse of voltage across controlled rectifier 3 is of relatively high amplitude and relatively high rate of rise owing to the amplification produced by master controlled rectifier 3. Since the rate of turn on of a controlled rectifier is related to the pulse area, the adjacent controlled rectifier 2 starts to turn on essentially simultaneously with the start of turn on of master controlled rectifier 3. Similarly the sympathetically fired controlled rectifier 2 causes the next adjacent controlled rectifier 1 to start to turn on essentially simultaneously.

To summarize the above action, rectifier 3 is fired in each positive half cycle of its anode voltage by a pulse current signal supplied from the phase controlled pulse supply 8, and within a small fraction of a microsecond thereafter controlled rectifiers 2 and 1 are fired sympathetically by current pulses supplied to their gate circuits from the capacitor stored energy circuit in response to the collapsing anode voltage of the controlled rectifier 3 and the immediately following collapse of anode voltage of rectifier 2.

Any charge, either positive or negative, that has begun to accumulate on the capacitors as a result of current flow from the intermediate terminal *14a* or *15a* is dissipated in the bleeder resistances 22, 23 and 24 that are respectively electrically connected with capacitors 14, 15 and 16.

The above sympathetic firing operation described for one positive half cycle of supply voltage occurs in each succeeding positive half cycle as long as the direct current supplied to the terminals 10 and 11 of the phase controlled pulse supply remains above the level required to fire the controlled rectifier 3.

The modification illustrated in FIG. 5 differs from the FIG. 1 modification primarily in the omission of the capacitors and damping resistors; hence the source 6, supply transformer 9 and load 7 are omitted. In the interest of simplicity only two series connected controlled rectifiers 26 and 27 are shown in FIG. 5 since the principle involved is the same as for a larger number. In a circuit in parallel with the rectifiers is connected an impedance voltage divider circuit that comprises two closely matched resistors 28 and 29. The rectifiers 26 and 27 may be assumed to have the same ratings and firing currents as the controlled rectifiers 1, 2 and 3 of FIG. 1 and the voltage applied to the series connected rectifiers may be assumed to be either an alternating voltage having a peak value of 200 volts or a direct voltage of 200 volts. With these assumed values, each of the resistors 28 and 29 would, in a typical case, preferably have a resistance of 400 ohms. Their common junction point *28a* is terminated on the gate electrode *26a* of controlled rectifier 26. Since the gate to cathode of a controlled rectifier behaves as a diode rectifier, exhibiting a relatively poor blocking characteristic the matched resistors 28 and 29 effectively balance the voltages across the controlled rectifiers 26 and 27 in their unfired conditions. The phase controlled pulse supply 8 may be the same as the pulse supply 8 of FIG. 1.

In operation, when the controlled rectifier 27 is turned on in response to a pulse of starting current supplied to its gate 27*a* from the pulse supply 8, its anode to cathode voltage begins to collapse. As its anode voltage decreases current flowing through the divider resistor 28 and into the gate 26*a* begins to increase and when it reaches the firing current value, assumed to be 100 milliamperes, controlled rectifier 26 is fired and becomes conducting. If the supply source is alternating voltage, this action is repeated in each half cycle in which the voltage at the anode of rectifier 26 is positive. For the values of voltage, resistance and firing currents assumed, the firing angle range for rectifier 26 would be approximately 157 degrees of the 180 degrees of a positive half cycle of anode voltage. The firing angle range can be increased by reducing the ohmic value of the divider resistors. For example, if these resistors were reduced to 200 ohms each the firing angle range would be increased to approximately 168 degrees and if further reduced to 100 ohms each the firing angle range would be increased to 174 degrees. However, the smaller the ohmic resistance of the resistors 28 and 29 the greater will be the power dissipation in these resistors and the smaller will be the unbalance of the voltages across the controlled rectifiers 26 and 27 during the firing process. The power dissipation can be reduced by increasing the ohmic value of the resistors but this leads to reduced firing angle range and increased unbalance of the voltages across the rectifiers. All these factors must be taken into account in determining the optimum ohmic value of the resistors to be used in any particular application.

The chief advantage of the FIG. 5 modification is its simplicity and low cost.

Figure 6:
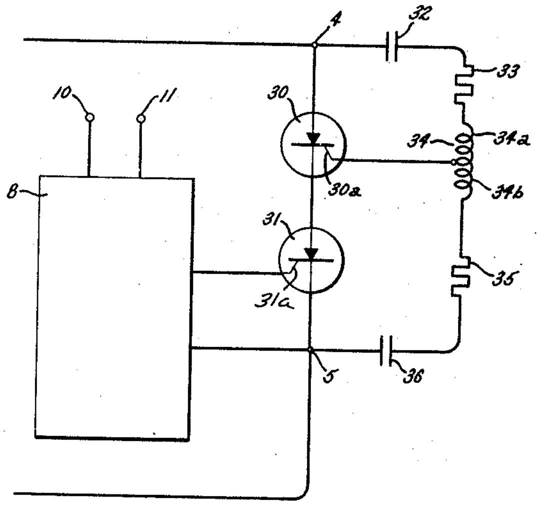

In the modification of FIG. 6, as in the modification of FIG. 5, only two controlled rectifiers 30 and 31 are shown. In parallel with the rectifiers is connected an impedance voltage divider circuit that comprises capacitor 32, damping resistor 33, transformer 34 having its mid tap terminated on the gate 30*a* of controlled rectifier 30, damping resistor 35 and capacitor 36. For rectifiers of the same ratings as those of FIGS. 1 and 5 and for the same supply voltage, in a typical case each of the capacitors 32 and 36 will have a capacity of one microfarad and each of the damping resistors will have a resistance of 3.3 ohms. These resistances could be the ohmic resistance of the transformer winding; 3.3 ohms would be the minimum value of resistance for each half of the winding. It could be greater, e.g., 10–12 ohms for each half. The transformer 34 is illustrated as an auto transformer with a mid tap. If three or more controlled half. The transformer 34 is illustrated as an autotransformer having a plurality of secondary winding sections equal in number to the rectifiers and wound upon a single core is employed. Whatever type of transformer is used the winding sections should be identical and closely coupled. The transformer is preferably designed to absorb the alternating component of the voltage across the rectifiers without saturating and is also designed so that the effect of its exciting current in producing voltage drops across the capacitors is relatively small. In operation immediately prior to turn on, the voltages across the rectifiers 30 and 31 are essentially balanced. The current flowing in the transformer circuit is mainly the transformer exciting current since by symmetry this is consistent with the voltage divider action of the bridge configuration of the rectifier and transformer circuits. When the turn on process of controlled rectifier 31 is initiated by a pulse of current supplied to the gate electrode 31*a* from the phase controlled pulse supply 8 the voltage generated in section 34*b* of the transformer winding is reduced in accordance with the resulting voltage collapse across rectifier 31. By transformer action an equal reduction in voltage across winding section 34*a* takes place and as a result current flows from both sections of the winding into the gate 30*a* of controlled rectifier 30 in a direction to turn it on.

A collapse of voltage across the controlled rectifier 31 is inconsistent with equal voltages across the transformer winding sections 34*a* and 34*b* and with low level current of the order of exciting current flowing in the divider circuit. Consequently the collapse of voltage across rectifier 31 requires substantial gate current to flow in gate 30*a*. This gate current produces voltage drops in both damping resistors 33 and 35 and capacitors 32 and 36. These voltage drops must be consistent with the collapse of voltage across rectifier 31. Since the impedance of the damping resistors and capacitors is relatively low substantial gate current to fire control rectifier 30 can result from a relatively small voltage change, i.e., can result before the collapse of voltage across rectifier 31 has proceeded very far. An advantage of this circuit is that it is very "stiff" and has the ability to hold balance very closely during the turn on process. Another important advantage is its high sensitivity, i.e., its ability to provide substantial gate current to the sympathetically controlled rectifiers in response to a very small percentage change of the total collapse of the voltage across the anode and cathode of the controlled rectifier that is turned on in response to firing current pulses supplied from a source of pulse supply.

Although in accordance with the patent statutes the best mode contemplated for carrying the invention into effect has been disclosed, it will be understood that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of a first of said rectifiers to initiate conduction therein, and means for sympathetically firing each of the remaining unfired rectifiers substantially simultaneously with the firing of said first rectifier and for balancing the voltages across said controlled rectifiers comprising an impedance voltage divider connected in parallel with said rectifiers and having a plurality of similar sections connected in series to provide a plurality of intermediate voltage points on said divider, each corresponding to the gate of a different one of said remaining rectifiers and an immediate electrical connection from each of the gates of said remaining rectifiers to a corresponding one of said intermediate voltage points for supplying a gate current signal from said voltage divider to the gate of each of said remaining rectifiers in response to initiation of conduction in an adjacent rectifier.

2. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of one of said rectifiers to initiate conduction therein, and means for balancing the voltage distribution across said rectifiers and responsive to the beginning of collapse of voltage across an adjacent rectifier for sympathetically firing each of the remaining non conducting rectifiers comprising an impedance voltage divider connected in parallel with said rectifiers and having a plurality of substantially equal resistor sections connected in series to provide a plurality of intermediate voltage points on said divider each corresponding to the gate of a different one of said remaining rectifiers, and an immediate electrical connection from each of the gates of said remaining rectifiers to a corresponding one of said intermediate voltage points for supplying a gate current signal from said voltage divider to the gate of each of said remaining rectifiers in response to the initiation of conduction in an adjacent rectifier.

3. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of one end of said rectifiers to initiate conduction therein, and means responsive to the beginning of collapse of voltage across an adjacent rectifier for sympathetically firing each of the remaining non conducting rectifiers comprising an impedance voltage divider connected in parallel with said rectifiers and having a plurality of closely coupled transformer winding sections connected in series to provide a plurality of intermediate voltage points each corresponding to the gate of a different one of said remaining rectifiers and an immediate electrical connection from each of the gates of said remaining rectifiers to the corresponding intermediate voltage point for supplying a gating current signal from said voltage divider to the gate of each of said remaining rectifiers in response to the initiation of conduction across an adjacent rectifier.

4. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of one of said rectifiers to initiate conduction therein, and means responsive to the beginning of collapse of voltage across an adjacent rectifier for sympathetically firing each of the remaining non conducting rectifiers comprising an impedance voltage divider connected in parallel with said rectifiers and having a plurality of closely coupled transformer winding sections connected in series to provide a plurality of intermediate voltage points, one for each gate of said remaining rectifiers, energy storage reactance means connected in circuit with said transformer winding sections and an immediate electrical connection between each of the gates of said remaining rectifiers and the corresponding intermediate voltage point for supplying a gating current signal from said voltage divider to the gate of each of said remaining rectifiers in response to the initiation of conduction in an adjacent rectifier.

5. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of one of said rectifiers to initiate conduction therein, and means for sympathetically firing each of the remaining unfired rectifiers and for providing balanced voltage distribution across said rectifiers comprising a plurality of energy storage devices, one for each of said rectifiers, connected in series relationship across said terminals and an immediate electrical connection from an intermediate terminal between successive energy storage devices to the gate of a corresponding one of said unfired rectifiers for supplying a gate current signal from said energy storage devices to the gate of each of said remaining rectifiers in response to the initiation of conduction in an adjacent rectifier.

6. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of one of said rectifiers to initiate conduction therein, and means responsive to the beginning of collapse of voltage across an adjacent rectifier for sympathetically firing each of the remaining non conducting rectifiers comprising an energy storage reactance means connected across said terminals and having a plurality of approximately equal reactance sections and an immediate electrical connection from each intermediate section terminal to the gate of a corresponding rectifier for supplying a gate current signal from said energy storage means to the gate of each of said remaining rectifiers in response to the initiation of conduction in an adjacent rectifier.

7. In combination, a pair of terminals adapted to be connected to a source of alternating voltage supply, a plurality of controlled rectifiers connected in series relationship with each other to said terminals and each having an anode, a cathode and a gate control electrode, means for supplying a gating current signal impulse to the gate of one of said rectifiers to initiate conduction therein in each cycle of said supply, and means responsive for the beginning of collapse of voltage across an adjacent rectifier for sympathetically firing each of the remaining non conducting rectifiers comprising a plurality of capacitors, one for each rectifier, connected to said terminals in series relationship with each other and an immediate electrical connection from each intermediate section terminal to the gate of a corresponding rectifier for supplying a gating current signal from said capacitors to the gate of each of said remaining rectifiers in response to the initiation of conduction in an adjacent rectifier.

8. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of one of said rectifiers to initiate conduction therein, means for sympathetically firing each of the remaining unfired rectifiers comprising a plurality of energy storage devices, one for each of said rectifiers, connected in series relationship across said terminals and an immediate electrical connection from an intermediate terminal between successive energy storage devices to the gate of a corresponding one of said unfired rectifiers for supplying a gating current signal from said energy storage devices to the gate of each of said remaining rectifiers in response to the intiation of conduction in an adjacent rectifier and means for counteracting the accumulation of charges on said energy storage devices opposing the flow of firing current in said gates comprising a plurality of resistors each connected in a circuit in parallel with a corresponding one of said energy storage devices.

9. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of one of said rectifiers to initiate conduction therein, and means responsive to the beginning of collapse of voltage across the conducting rectifier for sympathetically firing each of the remaining non conducting rectifiers comprising an energy storage reactance means connected across said terminals and having a plurality of approximately equal reactance sections and an immediate electrical connection from each intermediate section terminal to the gate of a corresponding rectifier for supplying a gating current signal from said energy storage means to the gate of each of said remaining rectifiers in response to the beginning of collapse of voltage across an adjacent rectifier, and a plurality of resistors each connected in parallel with a different one of said sections for dissipating charges produced therein by firing currents flowing through said connections to said gates.

10. In combination, a pair of terminals adapted to be connected to a source of supply, a plurality of controlled rectifiers connected in series relationship across said terminals and each having an anode, a cathode and a gate control electrode, means for supplying a gating current signal impulse to the gate of one of said rectifiers to initiate conduction therein, and means responsive to the beginning of collapse of voltage across said conducting rectifier for sympathetically firing each of the remaining non conducting rectifiers comprising an energy storage means having a plurality of approximately equal sections connected in series with each other to said terminals and immediate electrical connections from intermediate section terminals to the gates of corresponding rectifiers for supplying a gating current signal from said energy storage means to the gate of each of said remaining rectifiers in response to the beginning of the collapse of voltage across an adjacent rectifier and means for counteracting the tendency to oscillation produced by reactance in the rectifier circuit comprising a plurality of damping resistors each connected in series in a corresponding one of said energy storage sections.

11. In combination, a pair of terminals adapted to be connected to a source of alternating voltage supply, a plurality of controlled rectifiers connected in series relationship with each other to said terminals and each having an anode, a cathode and a gate control electrode, means for initiating conduction in a first of said rectifiers once in each cycle of said source comprising a source of gating current impulses synchronized with said alternating voltage supply, and having a connection to the gate of said first rectifier, means responsive to the beginning of collapse of voltage across said conducting rectifier for sympathetically firing each of the remaining non conducting rectifiers comprising a plurality of approximately equal capacitors, one for each of said rectifiers connected in series with each other to said terminals and an immediate electrical connection from an intermediate terminal between each capacitor and the next adjacent capacitor to the gate of a corresponding rectifier for supplying a gating current signal from said capacitors to the gate of each of said remaining rectifiers in response to initiation of conduction in an adjacent rectifier, and means for counteracting the accumulation of charges on said capacitor opposing the flow of firing current impulses in said gate comprising a plurality of substantially equal resistors, each connected in a circuit in parallel with a different one of said capacitors.

References Cited by the Examiner

UNITED STATES PATENTS

| | | | |
|---|---|---|---|
| 2,247,057 | 6/41 | Hull | 321—27 |
| 2,492,850 | 12/49 | De Mers | 315—181 |
| 2,825,002 | 2/58 | Brown | 315—188 |
| 2,925,546 | 2/60 | Berman | 321—8 |
| 3,100,268 | 8/63 | Foote | 321—46 X |

LLOYD McCOLLUM, *Primary Examiner.*

SAMUEL BERNSTEIN, *Examiner.*